United States Patent [19]

Inoue

[11] 4,445,336
[45] May 1, 1984

[54] INTERNAL COMBUSTION ENGINE EQUIPPED WITH SUPERCHARGER

[75] Inventor: Kazuo Inoue, Tokyo, Japan

[73] Assignee: Honda Giken Kogyo Kabushiki Kaisha, Tokyo, Japan

[21] Appl. No.: 346,379

[22] Filed: Feb. 5, 1982

[30] Foreign Application Priority Data

| Feb. 6, 1981 [JP] | Japan | 56-16340 |
| Feb. 6, 1981 [JP] | Japan | 56-16341 |
| Feb. 10, 1981 [JP] | Japan | 56-18557 |
| Feb. 23, 1981 [JP] | Japan | 56-25116 |

[51] Int. Cl.³ .................. F02B 33/44; F02D 23/00
[52] U.S. Cl. ................................ 60/605; 60/601; 60/603; 123/559
[58] Field of Search ............... 60/605, 601, 603, 612; 123/559

[56] References Cited

U.S. PATENT DOCUMENTS

| 3,143,849 | 8/1964 | Glamann | 60/612 |
| 4,299,090 | 11/1981 | Deutschmann | 60/612 |

FOREIGN PATENT DOCUMENTS

| 606244 | 10/1960 | Canada | 60/612 |
| 458350 | 12/1936 | United Kingdom | 60/601 |
| 516,835 | 9/1976 | U.S.S.R. | 60/605 |

Primary Examiner—William R. Cline
Assistant Examiner—John K. Ford
Attorney, Agent, or Firm—Armstrong, Nikaido, Marmelstein & Kubovcik

[57] ABSTRACT

An internal combustion engine is equipped with a supercharger which includes an intake port, an intake passage communicated with the intake port and a compressor interposed in the intake passage and compressing the intake air flowing through the intake passage. A unidirectional valve such as a reed valve is disposed inside the intake passage in series with the compressor in order to prevent backflow of the supercharged air inside the intake passage and thus to prevent a drop in the engine output when a throttle valve inside the intake passage is abruptly closed.

6 Claims, 5 Drawing Figures smaller than that of the intake passage 9 branches from the intake passage 9 between the reed valve 24 and the compressor C. A filter 27 such a metal net is disposed downstream of the branch passage 25 inside the intake passage 9. An air cleaner Ac is connected to the inlet port of the intake passage 9. The air cleaner Ac has a cleaner case 28 which is divided by a cleaner element 29 into a pre-element chamber $a_1$ and a post-element chamber $a_2$. The inlet port of the intake passage 9 and that of the branch passage 25 are open inside the post-element chamber $a_2$.

Various sensors are disposed inside the intake passage 9 in order to control the quantity of fuel injected from the fuel injection nozzle 19. A temperature sensor $T_e$ for detecting the temperature at the inflow port of the compressor C and a first pressure sensor $P_1$ for detecting the pressure at the same portion are connected to the intake passage 9 between the compressor C and the unidirectional valve 24. The temperature and pressure of the intake air reaching the inflow port of the compressor C passing through the reed valve 24 are detected by these sensors. A second pressure sensor $P_2$ is connected to the intake passage 9 at a position upstream of the throttle valve 20 but downstream of the compressor C and detects the supercharged intake pressure at the portion downstream of the compressor C and upstream of the throttle valve 20.

A third pressure sensor $P_3$ is connected to the intake passage 9 at a position downstream of the throttle valve 20 in order to detect the boost pressure therein. An angle sensor A is fitted to the throttle valve 20 to detect the throttle angle. Incidentally, the temperature of the supercharged air downstream of the compressor C can be determined by calculation from the values detected by the abovementioned sensors.

The heretofore known fuel injection and ignition timing controller determines the fundamental fuel injection quantity and the ignition timing using the speed of revolution of the internal combustion engine and its boost negative pressure (low load operating range of the engine) or the throttle opening (high load operating range of the engine) as its input, corrects the intake air quantity from the air density detected by the pressure and temperature sensors upstream of the compressor and the supercharging pressure downstream of the same, and practically controls the fuel injection quantity and the ignition timing.

A muffler M is connected to the outlet port of the exhaust passage 10.

Next, the operation of this embodiment of the invention will be explained.

In the exhaust stroke after the start of operation of the internal combustion engine equipped with the supercharger, the exhaust gas discharged from the combustion chamber 4 to the exhaust passage 10 passes through the turbine T and supplies its exhaust energy to the turbine vane wheel 14. Consequently, the turbine vane wheel 14 is rotated and drives the compressor vane wheel 13 via the rotary shaft 15 so that the air sucked into the intake passage 9 from the air cleaner Ac past through the reed valve 24 is compressed by the compressor C and delivered to the pre-chamber 21. After the flow rate is controlled by the throttle valve 20, the air mixes with the injection fuel from the fuel injection nozzle 19 and the air-fuel mixture is supplied to the combustion chamber 4 in the intake stroke of the engine. If a pressure pulsation occurs inside the intake passage 9 due to intermittent operation of the intake valve 7 or the like during the engine operation, the pulsation is damped by the pre-chamber 21 and the resonance chamber 23 so that the surging of the compressor C can be prevented and the air intake efficiency can be enhanced.

As described in the foregoing, it will be assumed again that the throttle valve 20 is abruptly closed after the throttle valve 20 had been open, the compressor C is operating and the engine is in the supercharged operation. If there is no reed valve 24 in the intake passage 9 in such a case, the compressed air that is supercharged inside the intake passage 9 instantaneously flows back inside the intake passage 9 and creates a disturbance in the flow such as shearing of the flowing air inside the compressor C. Accordingly, the supercharging effect is more or less lost when the throttle valve 20 is opened again and thus a predetermined output can not be obtained. As described in the foregoing, however, since the reed valve 24 is disposed inside the intake passage 9 and prevents the backflow of intake air when the throttle valve 20 is abruptly closed, development of the shearing phenomenon in the air flow can be prevented in advance and the internal combustion engine can provide the desired high output.

When the throttle valve 20 is abruptly closed, a part of the intake air flowing through the intake passage 9 flows back and reaches the air cleaner Ac passing through the branch passage 25 of a reduced diameter so as to reduce air pressure in the intake passage 9 downstream of the reed valve 24 to thereby enhance the engine brake efficiency. In this connection, it is to be noted that if a silencer 26 is connected to the branch passage 25, as shown by chain-dotted lines in FIG. 2, the silencer serves to effectively reduce offensive noises occurring upon abrupt closing of the throttle valve 20. Since the branch passage 25 is far smaller in diameter than the intake passage 9, the silencer only need be of a small size.

During engine operation, the first, second and third pressure sensors $P_1$, $P_2$, $P_3$, the temperature sensor $T_e$ and the angle sensor A operate to feed their detected values to the fuel injection and ignition timing controller. Because the first pressure sensor $P_1$ and the temperature sensor $T_e$ are interposed between the reed valve 24 and the compressor C inside the intake passage 9, they detect the pressure and temperature of the air at the inflow port of the compressor after passing through the reed valve 24, and so changes in the pressure and temperature due to the reed valve 24 need not be corrected for.

Though the foregoing embodiment uses the turbo supercharger S as the supercharger and a reed valve 24 as the unidirectional valve, other superchargers and unidirectional valves may also be employed. The unidirectional valve may be disposed at an arbitrary position of the intake passage 9 as long as it is disposed in series with the compressor C. If the reed valve 24 is disposed upstream of the compressor C inside the intake passage 9 as in the above-described embodiment, however, the reed valve 24 does not cause surging of the compressor C.

FIG. 3 shows another example of a supercharging system for an internal combustion engine E. In this embodiment, like reference numerals are used to identify like constituent elements as in the embodiment shown in FIG. 2.

In this embodiment, the unidirectional valve for preventing the backflow of the intake air flowing towards

INTERNAL COMBUSTION ENGINE EQUIPPED WITH SUPERCHARGER

BACKGROUND OF THE INVENTION

This invention is concerned with an improvement in an internal combustion engine equipped with a supercharger which enhances the air intake efficiency by compressing the intake air and improves the engine output.

DESCRIPTION OF THE PRIOR ART

Among various internal combustion engines, an internal combustion engine equipped with a supercharger has been known in the past in which a compressor is provided in the intake passage to compress the intake air to enhance the air intake efficiency and to improve the engine output. In this type of internal combustion engine, if a throttle valve is abruptly closed after the throttle valve has been kept open and the supercharger is being operated to compress the air keeping the engine running at a high speed, the compressed air inside the intake passage that has been supercharged instantaneously flows back to the upstream side of the intake passage through the compressor, and the flowing compressed air inside the intake passage, especially inside the compressor, causes disturbances in the flow such as a shearing phenomenon and generates an offensive noise. In this case, this intended supercharging effect can not be sufficiently obtained even when the engine speed is again increased and hence, the desired improvement in the engine output can not be accomplished.

SUMMARY OF THE INVENTION

In view of the state of the art as described above, the present invention is primarily directed to provide an internal combustion engine equipped with a supercharger which prevents the backflow of the supercharged air even when the throttle valve inside the intake passage is abruptly closed, and thus prevents a drop in the engine output.

It is another object of the present invention to provide an internal combustion engine equipped with a supercharger which reduces as much as possible the pressure change in the intake air flowing inside the intake passage and permits the engine to operate constantly in a stable manner.

According to the present invention, these objects can be accomplished by disposing a unidirectional valve inside the intake passage in series with the compressor to prevent the backflow of the intake air flowing through the intake passage.

The above and other objects, features and advantages of the invention will become apparent from the following detailed description of a few preferred embodiments when taken in conjunction with the accompanying drawings.

DESCRIPTION OF THE PREFERRED EMBODIMENTS

Hereinafter, an embodiment of the present invention, which is applied to a motor cycle, will be described with reference to the accompanying drawings.

Figure 1:
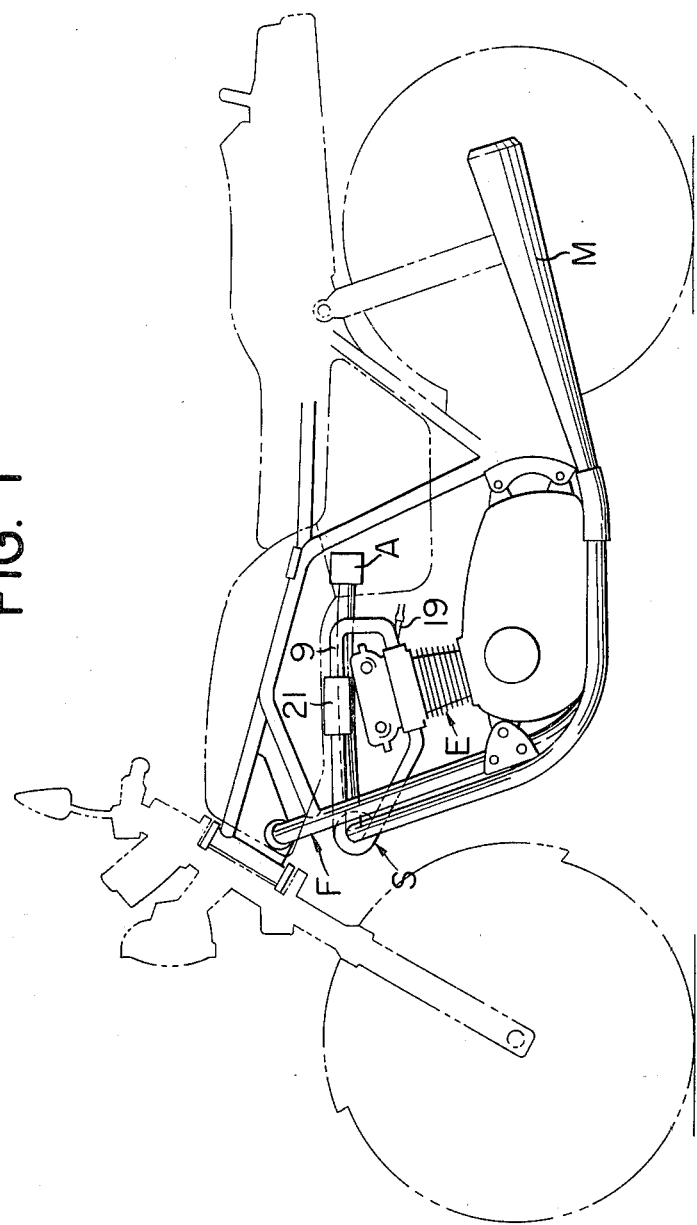
FIG. 1 is a side view showing the overall appearance of a motor cycle with an internal combustion engine equipped with a supercharger in accordance with the present invention.

In FIG. 1, an internal combustion engine E for driving the motor cycle is shown mounted to its frame F. The internal combustion engine E is equipped with a turbo supercharger S in order to enhance its air intake efficiency by compressing the intake air and to increase the engine output. This supercharger S is supported by the frame F.

Next, the supercharging system of the internal combustion engine E equipped with the turbo supercharger S will be explained with reference to FIG. 2. The main body of the internal combustion engine E includes a cylinder block 1 having a piston 3 slidably fitted therein and a cylinder head 2 fixed thereon, as is customary in the art. The cylinder head 2 and the piston 3 together form a combustion chamber 4, to which an intake port 5 and an exhaust port 6 open. These intake and exhaust ports 4, 5 are alternately opened and closed by intake and exhaust valves 7 and 8.

An intake passage 9 and an exhaust passage 10 are connected to the outer end portions of the intake and exhaust ports 5 and 6, respectively, and the turbo supercharger S is mounted bridging over these passages 9 and 10.

The turbo supercharger S includes a turbine T that is interposed at an intermediate portion of the exhaust passage 10 and a compressor C that is interposed at an intermediate portion of the intake passage 9. The turbine T consists of a turbine chamber 12 formed at an intermediate portion of the exhaust passage 10 and a turbine vane wheel 14 placed in the turbine chamber 12. The compressor C consists of a compressor chamber 11 formed at an intermediate portion of the intake passage 9 and a compressor vane wheel 13 placed in the compressor chamber 11. The turbine chamber 12 and the compressor chamber 11 are interconnected to each other as a unitary structure by a bearing holder 16. The turbine vane wheel 14 and the compressor vane wheel 13 are interconnected to each other so as to be capable of rotating together by a rotary shaft 15 that is supported by bearings 17, 18 inside the bearing holder 16.

A fuel injection nozzle 19 is fitted to the intake passage 9 close to the intake port 5 and a throttle valve 20 is disposed immediately upstream of the fuel injection nozzle 19. A pre-chamber 21 is formed by expanding a part of the cross-sectional area of the intake passage 9 upstream of the throttle valve 20. A branch passage 22 extends from the intake passage between the pre-chamber 21 and the compressor C and communicates with a resonance chamber 23.

A unidirectional valve for preventing the backflow of the intake air flowing towards the combustion chamber 4 inside the intake passage, such as a reed valve 24, is disposed upstream of the compressor C inside the intake passage 9. A branch passage 25 having a diameter far the combustion chamber 4, that is to say, the reed valve 24, is disposed at the inlet port 21 of the pre-chamber 21 downstream of the compressor C inside the intake passage 9. A by-pass passage 31 of a reduced diameter by-passing the reed valve 24 is arranged in the intake passage 9 and allows a part of the compressed air inside the pre-chamber 21 to gradually escape to the upstream side of the reed valve 24, thereby regulating the internal pressure of the pre-chamber 21.

During engine operation, therefore, the intake air inside the intake passage 9 downstream of the reed valve 24 is prevented from flowing back by the reed valve 24 so that even if a pressure change occurs inside the intake passage upstream of the reed valve 24 due to surging of the compressor C or the like, the pressure downstream of the reed valve 24 does not abruptly change, thereby stabilizing the engine operation. Even if a pressure pulsation occurs in the intake passage downstream of the reed valve 24 due to the opening or closing operation of the intake valve 7 or the like, its influence can not easily be exerted upon the compressor C, thus stabilizing the compressor operation.

On the other hand, a waste gate 32 by-passing the turbine T is connected to the exhaust passage 10. By allowing a part of the exhaust gas stream of the engine to escape into the waste gate 32, the pressure at the inlet port of the turbine T can be regulated. A waste gate valve 33 is operatively interposed at an intermediate portion of the waste gate 32 and the exhaust flow rate through the waste gate 32 can be regulated by adjusting the opening of this valve 33.

Figure 2:
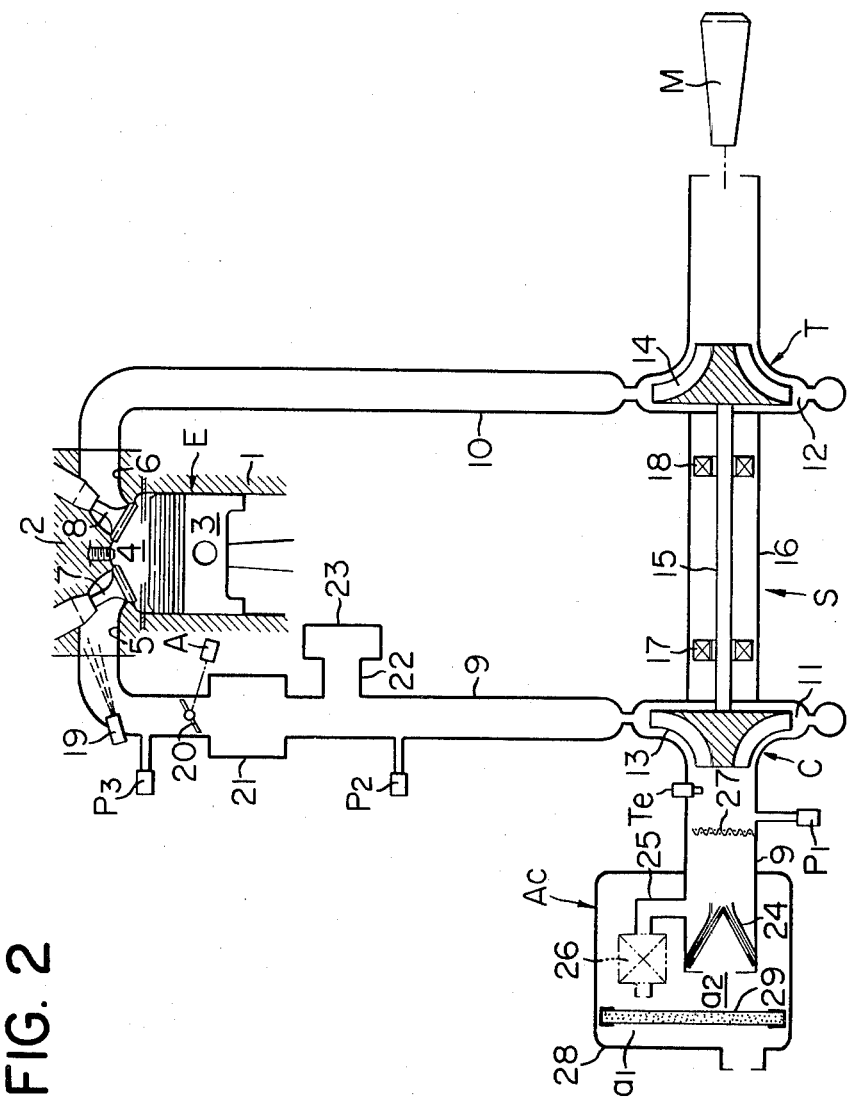
FIG. 2 is a schematic view showing the supercharging system of the internal combustion engine shown in FIG. 1.
Figure 3:
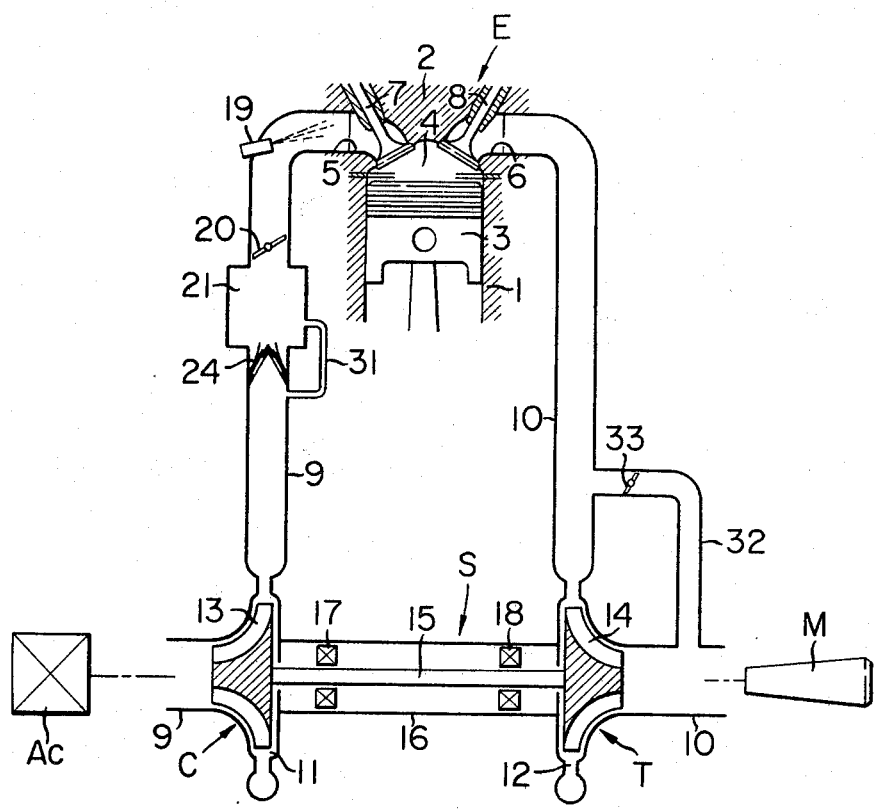
FIG. 3 is a view similar to FIG. 2, showing another form of the supercharging system.
Figure 5:
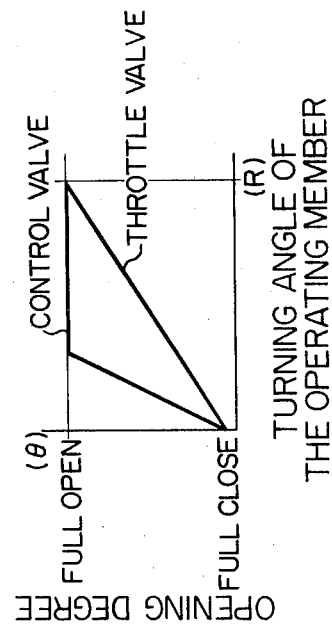
FIG. 5 is a graphic representation showing the relationship between the opening angles ($\theta$) of throttle and control valves and the turning angle (R) of an operating member.
Figure 4:
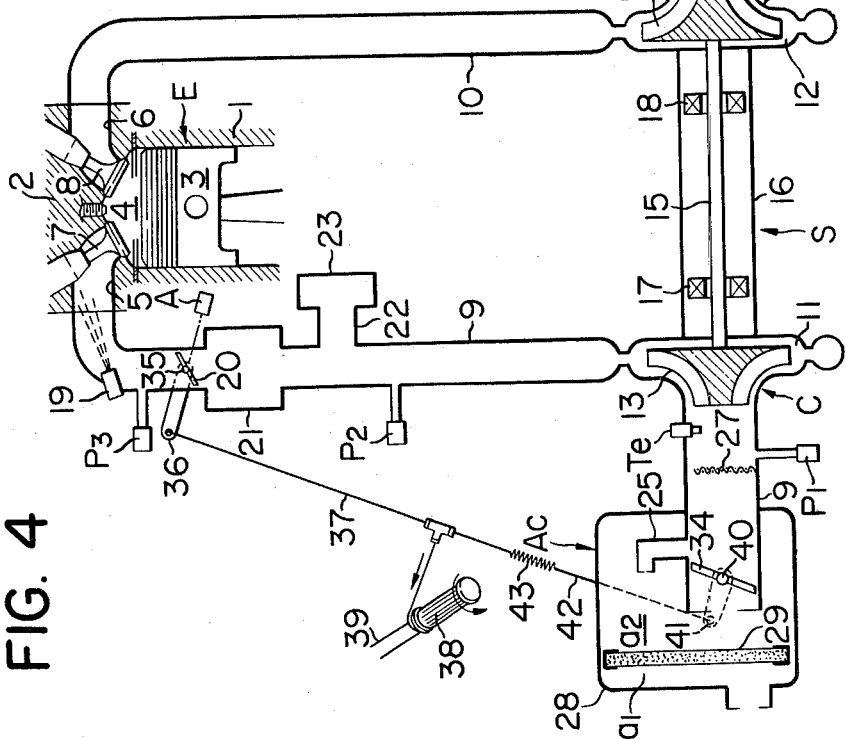
FIG. 4 is a view similar to FIG. 2 showing a modified form of the supercharging system.

FIG. 4 shows a modified form of the supercharging system as illustrated in FIG. 2. This modification is substantially similar to the FIG. 2 embodiment except for the fact that the reed valve is replaced by a control valve 34 which is operatively connected with the throttle valve 20 such that the former is opened and closed in response to the opening and closing of the latter at a much greater speed than that of the latter. More specifically, the throttle valve 20 is mounted on a throttle shaft 35 which is connected through a throttle link 36 and a throttle cable 37 to an operating member 38 such as a hand grip turnably fitted on a steering handle bar 39 so that the throttle shaft 35 can be rotated to open and close the throttle valve 20 by turning movement of the operating member 38. The control valve 34 is mounted on a control shaft 40 which is connected through a control link 41, a control cable 42 and a spring 43 to the operating member 38 so that the control shaft 40 is rotated to open and close the control valve 34 by turning movement of the operating member 38. The control link 41 is shorter in length than the throttle link 36 so that the control valve 34 is opened and closed more rapidly than the throttle valve 20 upon turning movement of the operating member 38. The relationship between the opening degrees ($\theta$) of the throttle and control valves 20 and 34 and the turning angle (R) of the operating member 38 is illustrated in FIG. 5 in which the abscissa represents the turning angle (R) and the ordinate represents the opening degree.

In summary, the present invention provides the following advantages.

First, since the unidirectional valve is disposed inside the intake passage in series with the compressor for compressing the intake air flowing therethrough in order to prevent the backflow of the intake air, it is possible to prevent flow disturbances of the intake air such as shearing inside the intake passage, especially inside the compressor, when the throttle valve is abruptly closed, thus accomplishing the intended supercharging effect and improving the engine output.

If the unidirectional valve is disposed inside the intake passage upstream of the compressor, it does not cause surging of the compressor.

The branch passage, branching from the intake passage between the unidirectional valve and the compressor and communicating with the atmosphere, serves to permit a part of the intake air in the intake passage to flow back to the atmosphere when the throttle valve is abruptly closed, as a consequence of which air pressure in the intake passage is reduced to enhance the engine brake efficiency.

The intake air density sensor means consisting of the pressure sensors and the temperature sensor is disposed inside the intake passage between the unidirectional valve and the compressor so as to determine the air density from the atmospheric pressure and external temperature of the intake air of the internal combustion engine. This arrangement makes it possible to use the pressure and temperature at the inlet port of the compressor as the reference for correcting the determined values and to eliminate the necessity of correcting them due to the changes in the pressure and temperature upstream and downstream of the unidirectional valve. Hence, the detection correction can be carried out easily and accurately despite the provision of the unidirectional valve.

The unidirectional valve such as the reed valve or the like is disposed inside the intake passage downstream of the compressor in order to stop the backflow of the intake air flowing through the intake passage. During engine operation, the intake air downstream of the unidirectional valve is prevented from flowing back by the unidirectional valve and even if a pressure change occurs on the upstream side of the unidirectional valve due to surging of the compressor or the like, the pressure on the downstream side of the unidirectional valve does not change drastically, so that the engine operation can be stabilized and the desired output can be constantly obtained. Moreover, even if the pressure pulsation occurs inside the intake passage downstream of the unidirectional valve due to the opening or closing operation of the intake valve or the like, its influence is not easily exerted on the compressor so that the compressor operation is also stabilized.

What is claimed is:

1. In an internal combustion engine equipped with a supercharger, including an intake port of the engine, an intake passage communicated with said intake port and atmosphere, and a compressor interposed in said intake passage for compressing the intake air from atmosphere flowing through said intake passage, the improvement wherein a control valve adapted for controlling backflow of intake air is disposed inside said intake passage upstream of and in series with said compressor in order to prevent backflow of the intake air flowing through said intake passage and a branch passage of smaller diameter than that of the intake passage branches from said intake passage between said control valve and said compressor and communicates with the atmosphere.

2. The internal combustion engine equipped with a supercharger as defined in claim 1, further comprising an intake air density sensor means disposed inside said intake passage between said control valve and said compressor for determining the intake air density at the inflow port of said compressor.

3. The internal combustion engine equipped with a supercharger as defined in claim 1 wherein said control valve comprises a reed valve.

4. The internal combustion engine equipped with a supercharger as defined in claim 1, wherein said branch passage is formed to connect between said intake passage and an air cleaner.

5. The internal combustion engine equipped with a supercharger as defined in claim 4, wherein said branch passage branches from said intake passage at a location within said air cleaner.

6. The internal combusion engine equipped with a supercharger as defined in claim 1, wherein said branch passage is equipped with a silencer therein.

* * * * *